(12) United States Patent
Vaananen

(10) Patent No.: US 10,262,289 B2
(45) Date of Patent: Apr. 16, 2019

(54) SOCIAL DRONE

(71) Applicant: Mikko Vaananen, Helsinki (FI)

(72) Inventor: Mikko Vaananen, Helsinki (FI)

(73) Assignee: Mikko Vaananen, Helsinki (FI)

(*) Notice: Subject to any disclaimer, the term of this patent is extended or adjusted under 35 U.S.C. 154(b) by 516 days.

(21) Appl. No.: 15/070,062

(22) Filed: Mar. 15, 2016

(65) Prior Publication Data

US 2017/0220977 A1    Aug. 3, 2017

Related U.S. Application Data

(60) Provisional application No. 62/289,970, filed on Feb. 2, 2016.

(51) Int. Cl.
*G06Q 10/08* (2012.01)
*G06Q 30/06* (2012.01)
(Continued)

(52) U.S. Cl.
CPC ......... *G06Q 10/083* (2013.01); *B64C 39/024* (2013.01); *G06Q 20/322* (2013.01); *G06Q 20/3224* (2013.01); *G06Q 30/0635* (2013.01); *G06Q 50/01* (2013.01); *G06Q 50/12* (2013.01); *B64C 2201/021* (2013.01);
(Continued)

(58) Field of Classification Search
CPC .................................. G06Q 30/0601–30/0645
See application file for complete search history.

(56) References Cited

U.S. PATENT DOCUMENTS 7,720,572 B2 * 5/2010 Ziegler .................... B25J 5/007
                                                            700/245
9,022,324 B1    5/2015 Abhyanker
(Continued)

FOREIGN PATENT DOCUMENTS

WO    2015061008 A1    4/2015
WO    2015/177760 A2    11/2015
(Continued)

OTHER PUBLICATIONS

Benson Ang, "Robot Lucy at your service at newly opened Rong Heng Seafood", Feb. 7, 2016, The Straits Times, pp. 1-3 (Year: 2016).*
(Continued)

*Primary Examiner* — William J Allen
*Assistant Examiner* — Maria S. P. Heath

(57) ABSTRACT

The invention discloses a waitressing drone that brings drinks to people at the restaurant, and the orders are identified from the Facebook photo of the user, that the drone displays when making the delivery. The invention facilitates the interaction with humans and drones via the social network. With the invention, the order input time is greatly reduced for the consumer, and the consumer may move about while waiting for the order as the drone finds the consumer. Also importantly, the social nature of the drone allows for the sharing of drones among multiple human users. Further, the interfacing of the social human profile with non-human drone profiles allows for the continuous retraining and reprogramming of drones to meet more specific and individualistic user tasks, thereby liberating people from mundane manual labour.

9 Claims, 7 Drawing Sheets

(51) Int. Cl.
*G06Q 50/00* (2012.01)
*B64C 39/02* (2006.01)
*G06Q 20/32* (2012.01)
*G06Q 50/12* (2012.01)

(52) U.S. Cl.
CPC .. *B64C 2201/024* (2013.01); *B64C 2201/027* (2013.01); *B64C 2201/108* (2013.01); *B64C 2201/127* (2013.01); *B64C 2201/128* (2013.01); *B64C 2201/146* (2013.01)

(56) References Cited

U.S. PATENT DOCUMENTS

| | | | |
|---|---|---|---|
| 9,174,733 | B1 | 11/2015 | Burgess et al. |
| 2014/0277854 | A1 | 9/2014 | Jones et al. |
| 2015/0120094 | A1* | 4/2015 | Kimchi ................ B64C 39/024 701/3 |
| 2015/0120504 | A1* | 4/2015 | Todasco ............... G06Q 20/322 705/26.61 |
| 2015/0379874 | A1 | 12/2015 | Ubhi et al. |
| 2016/0068264 | A1 | 3/2016 | Ganesh et al. |
| 2016/0104098 | A1 | 4/2016 | Matula et al. |
| 2016/0292798 | A1 | 10/2016 | Berry et al. |
| 2016/0364812 | A1 | 12/2016 | Cao |
| 2017/0011333 | A1 | 1/2017 | Greiner et al. |
| 2017/0011343 | A1 | 1/2017 | Stenneth et al. |

FOREIGN PATENT DOCUMENTS

| | | |
|---|---|---|
| WO | 2015192042 A1 | 12/2015 |
| WO | 2015199535 A1 | 12/2015 |

OTHER PUBLICATIONS

International Search Report and Written Opinion dated May 2, 2017 for International Patent Application No. PCT/FI2017/050025.

* cited by examiner

20

SOCIAL DRONE

TECHNICAL FIELD OF INVENTION

The invention relates generally to drone systems, and more specifically to drone systems controlled by mobile terminals for delivering products/services.

BACKGROUND

Currently, it is very time consuming to deliver products/services manually to different locations. Also, mobile phones are used worldwide for different types of work. It is possible, for example, to order a product with an iPad via Amazon.com, and this product might be delivered allegedly with a drone for some distance, as controlled by Amazon.

One prior art document WO 2015/177760 A2 discloses drones used in mail delivery, which drone can be controlled by a mobile phone and is cited here as reference.

However, the prior art is inappropriate for ordering goods or services that people consume right away outside their homes. This is because people move about and need the product or service right there and then at their possibly changed location.

If people want to use two different drones with the same terminal computer, this typically requires the control software installations from each drone to that terminal computer which is tedious.

In the prior art sharing economy, people also share access to their cars and apartments via dedicated applications such as Uber and/or Airbnb. The operation of these sharing systems requires a lot of labour from the people who share their cars or apartments.

Further, many of the tasks that drones do are typically small tasks. Therefore, the investment into providing instructions for the drone should be small. Further, as we live in a consumer choice driven market economy, it is a disadvantage in that the suppliers like Amazon, control the drone activity, instead of the customers.

SUMMARY

It is an object of the invention to facilitate the easy use of a plurality of drones by a consumer.

In one aspect of the invention the making of the order to the drone is done from the mobile handset by utilising the social network information of the user.

The user profile data on the social network is entered in as customer data for the purpose of the transaction.

In another aspect of the invention, the payment data is provided automatically to the drone from the social network profile data, if it has that data, or from the user data of the terminal device. For example, the payment data stored in the iCloud account of the user, or other cloud based account could be used to provide the payment data.

In another aspect of the invention, the mobile subscriber terminal provides location information to the drone system, continuously or at random or short intervals which the drone can use to approach the user dynamically. This way the drone will come to the user wherever he is.

In a further aspect of the invention, at least one drone has a social network profile of their own. This non-person profile is such a profile that it allows to interface with humans on the social network. This way, people can instruct drones on the social network to perform activities for them, similarly to how wives instruct their husbands to go to shop, fetch the kids from the kindergarten etc. The status of the user providing the instruction and the context information is readily provided from a social network like Facebook, so that the drone can be programmed to serve the user as appropriately as possible. Typically, the drone will lookup or search for a response that matches with the status or any other attribute derivable from the social network profile of the user and derive a suitable response, for example based on past interactions of users and the drone system, which may be supplemented by review data from users or pre-programmed data. For example, if the status of the user is "in a hurry" the drone system can configure the delivery of the product or service to maximum speed, whereas if the status is "just chilling" or the like a slower pace delivery can be selected by the drone system. Also, over time data will be gathered from a plurality of drone tasks for a plurality of users of certain type, as defined by their social network profiles. This way, the services provided by drones can be programmed and improved further still.

In one aspect of the invention, the non-human social network profile typically lists capabilities and attributes that the drone has, which include payload, speed, response time, cost, cost per unit of time for use and the like. The human users may readily evaluate these attributes based on their needs when they are determining whether to engage the drone to do something, via their social network profile, or drone app or via some other communication method. Further, the non-human social network profile also typically lists activities that the drone is capable of performing, such as transport of people and/or goods, shopping, waitressing, garbage collection, laundry processing, vacuum cleaning, cleaning, mopping, lawn mowing, tree and/or bush cutting and the like. There is a benefit in specialisation, which is amplified by the inventive ability to share the specialised drones, and therefore consumers may use a very limited set of drones for a limited activity, and it will be worthwhile designing drones for one activity only and sharing that drone among a plurality of social human users in accordance with the invention.

In this application, the drone is essentially a robot, a quadrocopter or any flying drone, or a self driving car. The drone can be used also to transport people in accordance with the invention.

In one aspect of the invention the sharing of the drones takes place via an application installed on a mobile subscriber terminal. This application is typically an iOS, Android and/or Windows phone application, but may also be an application leveraging social network and search engine APIs (Application Programmer Interface), and being able to interact with a social network and/or a search engine. In one embodiment this application is integrated with the social network and/or with the search engine, via APIs or otherwise, for example as a proprietary part of the social network and/or search engine. Naturally the drone control application can be programmed to interface with the social network and/or search engine APIs in accordance with the invention.

The user typically opens the app and is presented with a user interface that displays the drones that would be available for hire, and this can be displayed as a list or on a map, showing where the user(s) and the drones are for example. Typically, the user interface shows the drone, the type of service it provides, the price of the service per unit of time, and the time it takes for the drone to arrive and/or begin the requested service at the requested location, which of course can be different than the location of the user but is not necessarily different. For example, a shopping drone could be sent directly to the shop from wherever it is and be programmed to bring the purchased items to the location of the user or to the address of the user, or to a location, constant or variable, specified by the user. The drone will typically navigate based on GPS and/or cellular/WI-FI locations and be controlled by a camera or other sensors in the immediate proximity to avoid collisions and find a favourable route.

The user then selects the drone and the service he/she purchases from the drone, and typically but not necessarily authorises the purchase by payment details from his/her credit card. The application typically stores the payment details of at least one credit card with which the payment of the purchase can be carried out. The purchase and the payment may contain only the price of the service of the drone, or the price of the purchase, but may also comprise other products or services that are necessary to purchase for carrying out the service that the drone is executing for the user.

Examples may include the collection and retrieval of groceries from a shop, where the prices of the groceries and the service charge for the drone collecting and delivering the groceries are charged. Similarly, different activities from the same drone can be priced differently, for example waiting could be charged at a lower rate than flying and/or driving, as the wear-and-tear cost on the drone is higher when it is performing an active service, in contrast to just waiting.

In a further aspect of the invention, the physical drone itself incorporates social network data from the user. For example, the social network profile photo can be displayed by the drone on e.g. a screen, to show that this particular drone is serving the particular user whose picture is displayed by the drone.

A computer system in accordance with the invention comprises at least one mobile subscriber terminal, at least one drone and/or at least one server computer, and a communication network and is characterised in that, The mobile subscriber terminal is configured to have an application installed that allows the user to select a product or service,
   The application is configured to receive the user choice and transmit the choice and/or social network profile or personal data of the user to the drone and/or the server computer with the location and/or identity of the mobile subscriber that made the selection,
   at least one drone is configured to retrieve the product and/or prepare for delivery of service and approach the mobile subscriber location or another location specified by the user, both that are optionally being sent multiple times to the drone until the product or service is delivered.

A computer software program product in accordance with the invention is stored in a memory medium, operable with at least one mobile subscriber terminal, at least one drone and/or at least one server computer, and a communication network and is characterised in that, The mobile subscriber terminal is configured to have an application installed that allows the user to select a product or service,
   The application is configured to receive the user choice and transmit the choice and/or social network profile or personal data of the user to the drone and/or the server computer with the location and/or identity of the mobile subscriber that made the selection,
   at least one drone is configured to retrieve the product and/or prepare for delivery of service and approach the mobile subscriber location or another location specified by the user, both that are optionally being sent multiple times to the drone until the product or service is delivered.

A method for delivering products and/or services in accordance with the invention comprises at least one mobile subscriber terminal, at least one drone and/or at least one server computer, and a communication network and is characterised in that, The mobile subscriber terminal application allows the user to select a product or service,
   The application receives the user choice and transmits the choice and/or social network profile or personal data of the user to the drone and/or the server computer with the location and/or identity of the mobile subscriber that made the selection,
   at least one drone retrieves the product and/or prepares for delivery of service and approaches the mobile subscriber location or another location specified by the user, both that are optionally being sent multiple times to the drone until the product or service is delivered.

A computer software program product stored in accordance with the invention is in a memory medium and is characterised in that, at least one drone is configured to have a non-human social network profile and/or is configured to be controlled from at least two mobile applications on different user mobile subscriber terminals.

The aforementioned non-human social network profile is configured to interface and receive instructions from at least one human social network profile in accordance with the invention.

A computer system is in accordance with the invention and comprises at least one mobile subscriber terminal, at least one drone and/or at least one server computer, and a communication network and is characterised in that, The mobile subscriber terminal is configured to have an application installed that allows the user to select a product or service,
   The application is configured to receive the user choice and transmit the choice and/or social network profile or personal data of the user to the drone and/or the server computer,
   at least one drone is configured to receive said user choice and said user data via a non-human social network profile of said drone.

A computer system is in accordance with the invention and comprises at least one mobile subscriber terminal, at least one drone and/or at least one server computer, and a communication network and is characterised in that, The mobile subscriber terminal is configured to have an application installed that allows the user to select a product or service,
   The application is configured to receive the user choice and transmit the choice and/or social network profile or personal data of the user to the drone and/or the server computer,
   at least one drone is configured to receive said user choice and said user data via a non-human social network profile of said drone and/or from at least two mobile applications on different user mobile subscriber terminals.

A method for delivering products and/or services is in accordance with the invention and comprises at least one mobile subscriber terminal, at least one drone and/or at least one server computer, and a communication network, characterised in that, The mobile subscriber terminal application allows the user to select a product or service, The application receives the user choice and transmits the choice and/or social network profile or personal data of the user to the drone and/or the server computer, at least one drone is configured to receive said user choice and/or said user data via a non-human social network profile of said drone and/or from at least two mobile applications on different user mobile subscriber terminals.

The invention has sizable advantages. The order input time is greatly reduced for the consumer, the consumer may move about while waiting for the order as the drone finds the consumer. The user can utilise multiple drones flexibly while doing something else himself. Also importantly, the social nature of the drone allows for the sharing of drones among multiple human users. Further, the interfacing of the social human profile with no-human drone profiles allows for the continuous retraining and reprogramming of drones to meet more specific and individualistic user tasks.

The best mode of the invention is considered to be a waitressing drone that brings drinks to people at the restaurant, and the orders are identified from the Facebook photo of the user, that the drone displays when making the delivery. The best mode of the invention makes it possible to order e.g. a drink in a crowded bar from a mobile phone, while the customer is moving, and the drone then "homes in" on the location of the customer and delivers the drink to customer. Thereby drinks are provided to the patrons more efficiently than by human waitresses in the best mode of the invention.

Some of the embodiments are described in the dependent claims.

DETAILED DESCRIPTION OF EMBODIMENTS

Figure 1:
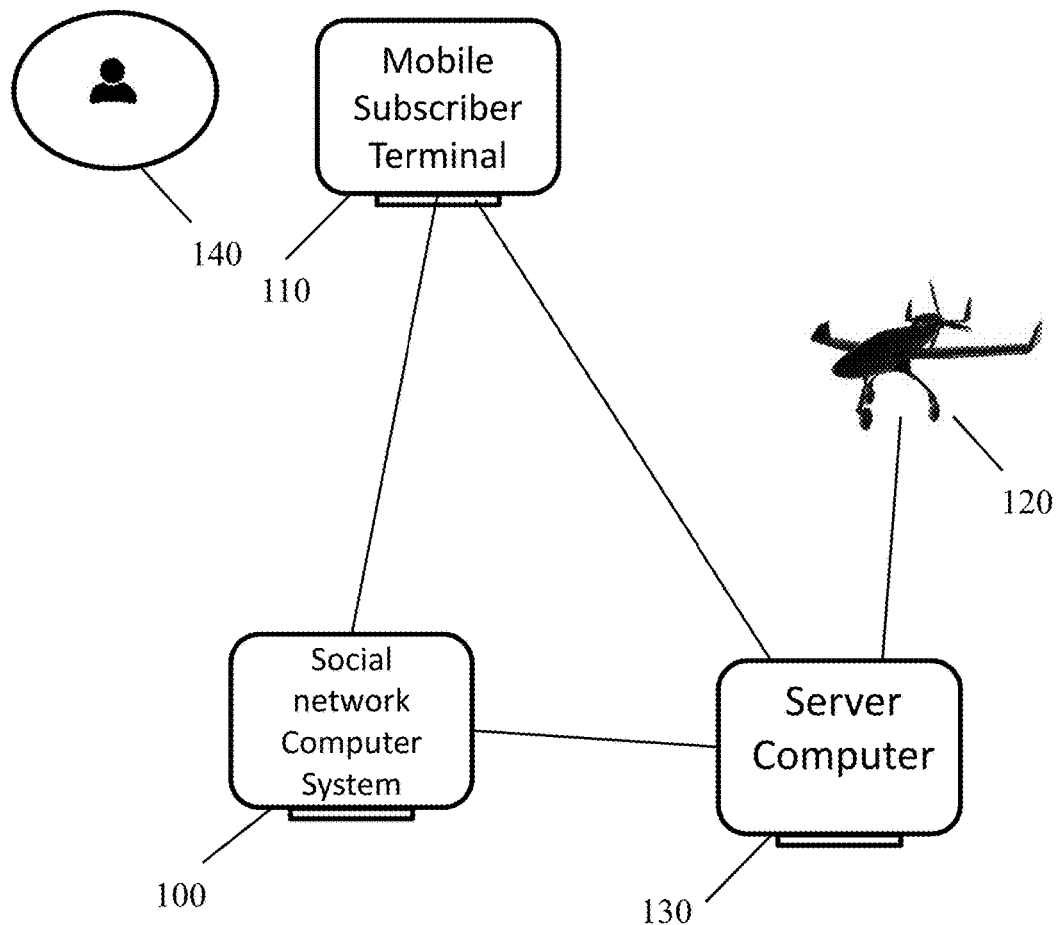
FIG. 1 demonstrates an embodiment 10 of the drone system as a block diagram.

FIG. 1 demonstrates an embodiment 10 of the drone ordering and delivery system as a block diagram.

At least one mobile subscriber terminal 110, typically a smartphone and/or a tablet is used to select a product or a service that the at least one drone will deliver. The mobile subscriber terminal is typically a mobile smartphone, such as iOS, Android or a Windows Phone smartphone.

However, it is also possible that the subscriber terminal 110 is a mobile station, mobile phone or a computer, such as a PC-computer, Apple Macintosh-computer, PDA-device (Personal Digital Assistant), or UMTS- (Universal Mobile Telecommunication System), GSM- (Global System for Mobile Telecommunications), WAP- (Wireless Application Protocol), Teldesic-, Inmarsat-, Iridium-, GPRS- (General Packet Radio Service), CDMA- (Code Division Multiple Access), GPS- (Global Positioning System), 3G-, 4G-, Bluetooth-, WLAN- (Wireless Local Area Network), Wi-Fi and/or WCDMA (Wideband Code Division Multiple Access) -mobile station. Sometimes in some embodiments the subscriber terminal is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

In FIG. 1 there is a network server computer 130, which may include an input-output device, usually made up of a monitor (display), keyboard, mouse and/or touch screen. However, typically there is more than one computer server in use at one time, so some computers may only incorporate the computer itself, and no screen and no keyboard. These types of computers are typically stored in server farms, which are used to realise the cloud network used by the drone system of the invention. The cloud network can be purchased as a separate solution from known vendors such as Microsoft and Amazon and HP (Hewlett-Packard). The server computers 130 typically run Unix, Microsoft, iOS, MacOS, Linux or any other known operating system, and comprise typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using flash as the backbone storage for the cloud network is preferred despite its high cost due to the reduced latency that is required and/or preferred for drone systems, especially those that involve payments. I.e. when the person is paying the bill in a Helsinki restaurant to a drone waiter, there is no need to retrieve all data from a hard drive in San Francisco that would take possibly too much time to leave a happy waiter and customer. Instead the data is pulled from a Flash storage in Munich, Hamina or Stockholm, where the pan-global server farms with flash based capabilities might be located.

At least one drone 120 is any type of robot, a quadrocopter or any flying drone, or a self driving car. The drone can be used also to transport people in accordance with the invention.

The communication network used for the communication in the invention is the wireless or wireline Internet or the telephony network, which is typically a cellular network such as UMTS- (Universal Mobile Telecommunication System), GSM- (Global System for Mobile Telecommunications), GPRS- (General Packet Radio Service), CDMA- (Code Division Multiple Access), 3G-, 4G-, 5G, Wi-Fi and/or WCDMA (Wideband Code Division Multiple Access) -network.

Typically, the mobile subscriber terminal 110 is configured to have an application installed that allows the user to select a product or service. The social network 100 is typically Facebook, Twitter, LinkedIn, or the like, and these social networks typically contain non-human user profiles for drones or drone profiles that might be ultimately managed by, or associated with, a human drone manager. Both alternatives are understood to be non-human social network profiles in this application. The user accesses the social network via a website in some embodiments, but preferentially there is a social drone control app installed on the mobile smartphone, that is capable of reading the information from the social network and/or capable of inputting information to the social network and/or to at least one drone directly via a short range radio link or via the cloud server network.

Preferably the user downloads the app from the Internet, or the various app stores that are available from Google, Apple, Facebook and/or Microsoft. For example, in some embodiments an iPhone user with a Facebook app on his phone will download a social drone app that is compatible with both the Apple and Facebook developer requirements. Similarly, a customized app can be produced for the other different handset and social network environments. It is possible that the drone controlling functionality is integrated into a social network, so that a social network app, such as Facebook App would have the drone controlling functionality integrated in itself. Also, it is possible that there is a separate App, lets call it SocialDrone that interfaces with the Facebook app to provide the drone controlling functionality in a different App, but is able to communicate data with the Facebook App. The drone controlling functionality of the invention could also be integrated into Facebook Messenger in some embodiments. It is also possible that there is no involvement with the smartphone social network app, i.e. the social drone control app is just an app, or the only app, on the smartphone and any social network data is imported and exported to the drone control app directly from the social network servers. It is also possible that there is a drone control app installed on the mobile subscriber terminal, and this app is connected to a cloud network, to which the drones are also connected to, and the control of the drones is effected through the cloud network without using the social network.

The application is configured to receive the user 140 choice of a product, service and/or activity and transmit the choice and/or social network profile or personal data of the user 140 to the drone 120 directly via a radio link in some embodiments.

However, preferably the user choice, or data pertaining to it, is sent to at least one drone 120 via the server computer/cloud 130 and/or social network computer system 100 with the location of the mobile subscriber (110) that made the selection.

Upon receipt of the user choice and user terminal location, the at least one drone 120 is configured to retrieve the product and/or prepare for delivery of service and/or product and approach the mobile subscriber location that is optionally being sent multiple times to the drone 120 until the product or service is delivered. This allows the drone to approach the user efficiently, even when the user moves around. Therefore, this feature is highly desirable to a waitressing drone in a nightclub or variable seating setting, where the customers choose to move around while they wait for their order. Similarly, a shopping drone could be used to assemble purchases, e.g. groceries, together in a shop, and bring the assembled groceries to the user's mobile phone location so that the user can purchase the items collected by the drone. In one embodiment a shopping list is sent to a drone, and the drone collects the items on the shopping list and delivers them either to the user or to the address of the user, or to a location specified by the user, typically with his mobile subscriber terminal by providing an address or location on a map, or by selecting another user, which can be located by the drone based on his/her mobile subscriber terminal location. In one embodiment, the shopping drone could be programmed to deliver the purchases to another drone, for example to a self driving car, which could also be managed by the user in accordance with the invention.

Any features of embodiment 10 may be readily combined or permuted with any of the other embodiments 20, 30, 40, 50, 60, and/or 70 in accordance with the invention.

Figure 2:
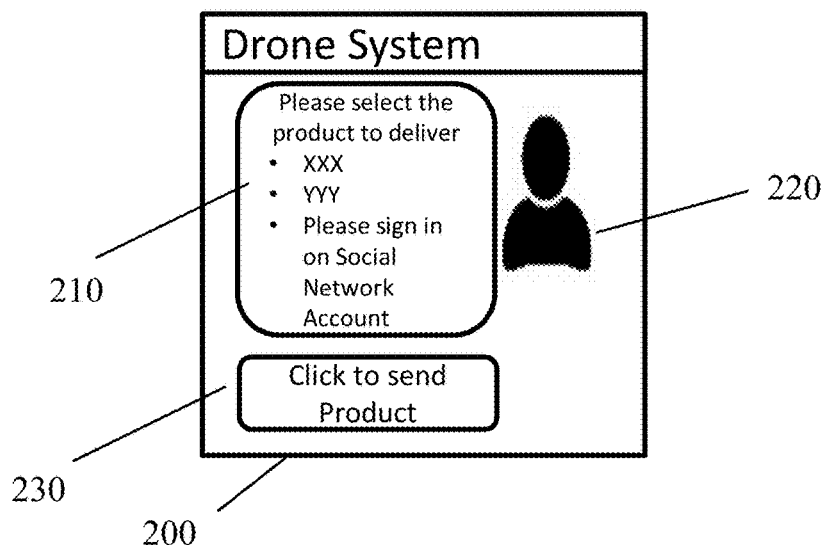
FIG. 2 demonstrates an embodiment 20 of the software programme product in accordance with the invention as a screen shot diagram.

FIG. 2 demonstrates an embodiment 20 of a software program product consumer user interface in accordance with the invention as a screen shot diagram. This could be for example the screen of a smartphone. The system behind the user interface could be e.g. embodiment 10 explained earlier. The user selects a product from alternatives XXX, YYY displayed in screen section 210 for example by touching or pointing the text links XXX or YYY on the screen. The user may sign in to the system with his social network account 220. In some embodiments an order button 230 appears on the screen, which can be clicked to finalise the ordering of the earlier selected product.

The computer software program product is stored in a memory medium either on the terminal or on the network, or distributed between the two, so that some parts reside in the server network and some parts of the software program product reside in the terminal device.

The software program product is operable with at least one mobile subscriber terminal 110, at least one drone 120 and/or at least one server computer or cloud network 130, and also via a communication network. Typically, the mobile subscriber terminal 110 is configured to have an application installed that allows the user to select a product or service, and the application user interface 20 could be the user interface of the aforementioned application.

Preferably, the application 20 is configured to receive the user choice and transmit the choice and/or social network profile or personal data of the user to the drone (120) and/or the server computer (130) with the location of the mobile subscriber that made the selection, or a location, constant or variable, that was specified from the mobile subscriber terminal and/or application 20.

Upon receiving the user choice and the location of the terminal of the user at least one drone (120) is configured to retrieve the product and/or prepare for delivery of service and approach the mobile subscriber location that is optionally being sent multiple times to the drone 120 until the product or service is delivered. Alternatively, the product or service is delivered to another location specified by the user from the mobile subscriber terminal, and this location can also be sent multiple times, especially when it changes, e.g. due to the movement of the person and/or drone to whom the delivery has been sent.

Any features of embodiment 20 may be readily combined or permuted with any of the other embodiments 10, 30, 40, 50, 60, and/or 70 in accordance with the invention.

Figure 3:
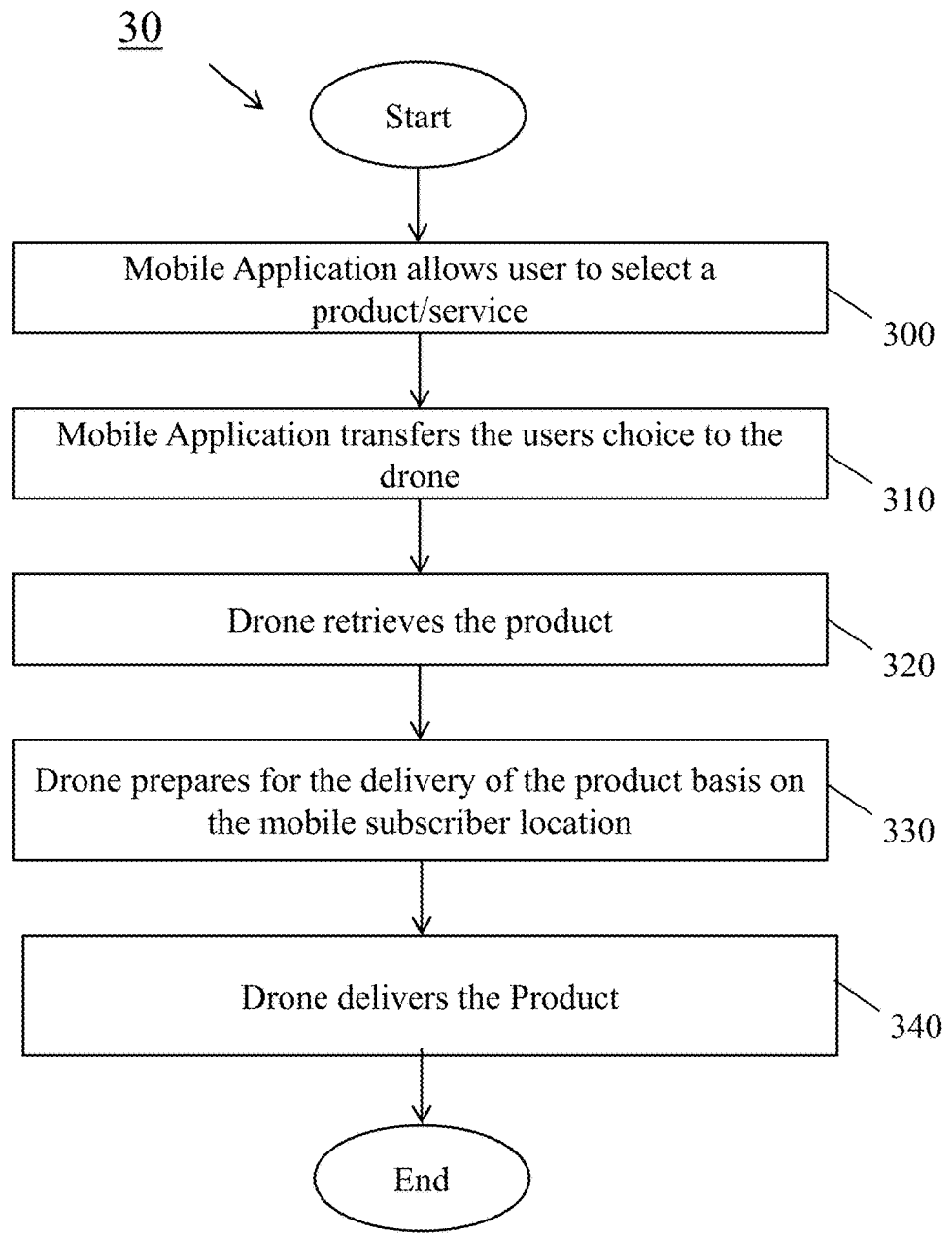
FIG. 3 demonstrates an embodiment 30 of the method for delivering products in accordance with the invention as a flow diagram.

FIG. 3 demonstrates an embodiment 30 of the drone delivery method in accordance with the invention as a flow diagram. The method 30 could be implemented in a system identical or similar to embodiment 10 in FIG. 1 for example. The end-user of the method 30 could use a user interface identical or similar to that disclosed with embodiment 20 in FIG. 2.

A method for delivering products and/or services inventively with drones typically features at least one mobile subscriber terminal 110, at least one drone 120 and/or at least one server computer 130, and a communication network which is typically the wireless Internet relying on Wi-Fi or a cellular radio data connection.

In phase 300 the mobile subscriber terminal application allows the user to select a product or service. This could be e.g. a Diet Coke drink in a bar.

In phase 310 the application receives the user choice and transmits the choice and/or social network profile or personal data of the user to the drone and/or the server computer with the location of the mobile subscriber that made the selection. Now the drone knows the identity and location of the user, and the fact that this user ordered a Diet Coke.

In phase 320 at least one drone retrieves the product, for example in this case it could fetch a portion of say, 3 decilitres of Diet Coke into a plastic mug and secure the filled mug for transport, or the drone could retrieve a can of Diet Coke. However, in some embodiments the drone has the product already, and the drone can immediately embark on its delivery to the user. However, it is also possible for the user to specify a delivery time for the drone to deliver the product or service at a later time to the specified location in accordance with the invention.

In phase 330 the drone prepares for delivery of service and approaches the mobile subscriber terminal location while carrying the mug of Diet Coke. This location is optionally being sent wirelessly multiple times to the drone until the Diet Coke is delivered in phase 340, which allows the customer to move around, as the drone will bring the Diet Coke to where ever he happens to be with his mobile subscriber terminal that is transmitting the location. Alternatively, in some embodiments the Diet Coke can could be sent to a friend to a location specified e.g. from a map or by providing an address, or the user could select the friend for delivery and the drone system and/or server or cloud network 130 could be set up to discover the location of the friend's mobile subscriber terminal and bring the Diet Coke there. In some embodiments this feature of the invention is realised by using the already existing functionality in the "Find my Friends" application available both on iOS and/or Android, for example so that the Diet Coke recipient for the drone delivery is allowed to be selected from the data that "Find my Friends" app produces or directly from the app itself.

Any features of embodiment 30 may be readily combined or permuted with any of the other embodiments 10, 20, 40, 50, 60, and/or 70 in accordance with the invention.

Figure 4:
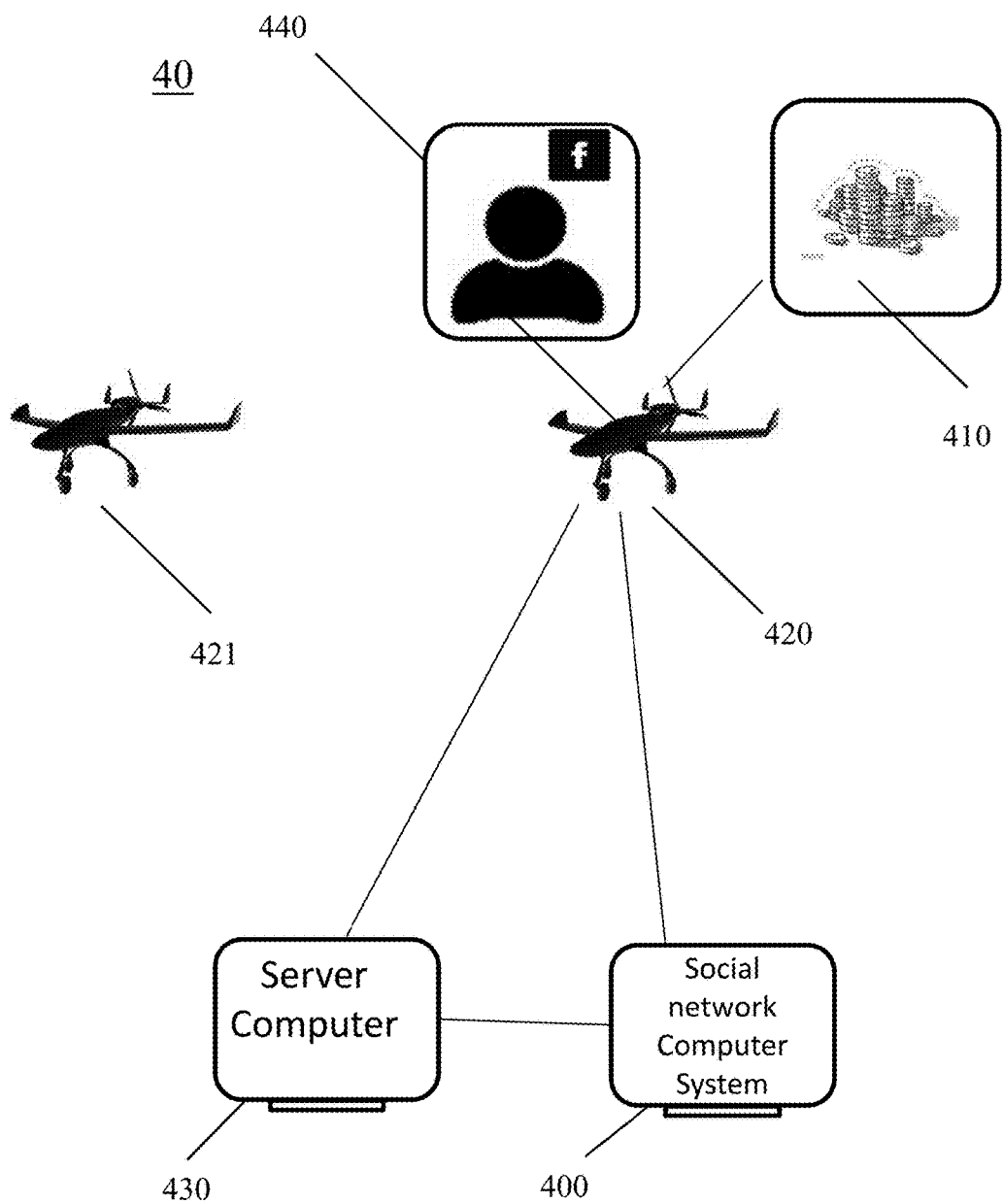
FIG. 4 demonstrates an embodiment 40 of a more elaborate drone system in accordance with the invention as a block diagram.

FIG. 4 demonstrates an embodiment 40 of a more elaborate drone system in accordance with the invention as a block diagram. In FIG. 4 the drones 420, 421 are waitressing drones that are configured to fly or drive to deliver food and beverage orders to customers. The drone 420 is configured to collect payment 410 via credit card, such as but not limited to VISA MASTERCARD, AMEX, DISCOVERY, or the like. Also NFC (Near Field Communication), PayPal, Apple Pay, Facebook payment, bank wire or any other payment method that the consumer can initiate from his portable subscriber terminal can be used in accordance with the invention. In some embodiments the drone can take a photograph of a credit card and extract the credit card details fro the photograph for example by OCR (Object Character Recognition), and the request the user to enter any additional information that may be required to complete payment. If the user uses cash the drone may collect cash in accordance with the invention.

The drone (420) is configured to display social network data, such as the user picture (440), to help identify to the consumers which drone is servicing which user. When the order of the person in 440 is ready, the drone 420 will deliver the order to the location of the mobile subscriber terminal that placed the order or another specified location, and display the picture 440 or other data relating the drone and the order and the customer who made the order. It is possible also that a picture or other data are shown about the order recipient, if different form the customer who made the order. Thereby it is easy for the consumer who made the order, to collect the correct order from the correct drone and consequently make the correct payment to the correct drone. The drone may update both payment data and/or social network data to the server computer 430 and/or the Social network 400. For example, a payment record storing and displaying both price, time, place and/or possibly photo of the purchase situation may be stored in an electronic record that is saved either on the server computer and/or the social network.

In bigger implementation embodiments, for example with big restaurants, the server computer (430) is configured to receive said user orders and be in connection with a fleet of a plurality of drones, and is configured to select, optionally queue, and dispatch the orders to individual drones (420, 421). For example a restaurant with 300 seats might have for example 30 beverage bearing drones serving customers all the time and when an order for a "Diet Coke" comes in, the drone with a Diet Coke nearest to the subscriber terminal that made the order, brings his Diet Coke to the customer that made the order.

Any features of embodiment 40 may be readily combined or permuted with any of the other embodiments 10, 20, 30, 50, 60, and/or 70 in accordance with the invention.

Figure 5:
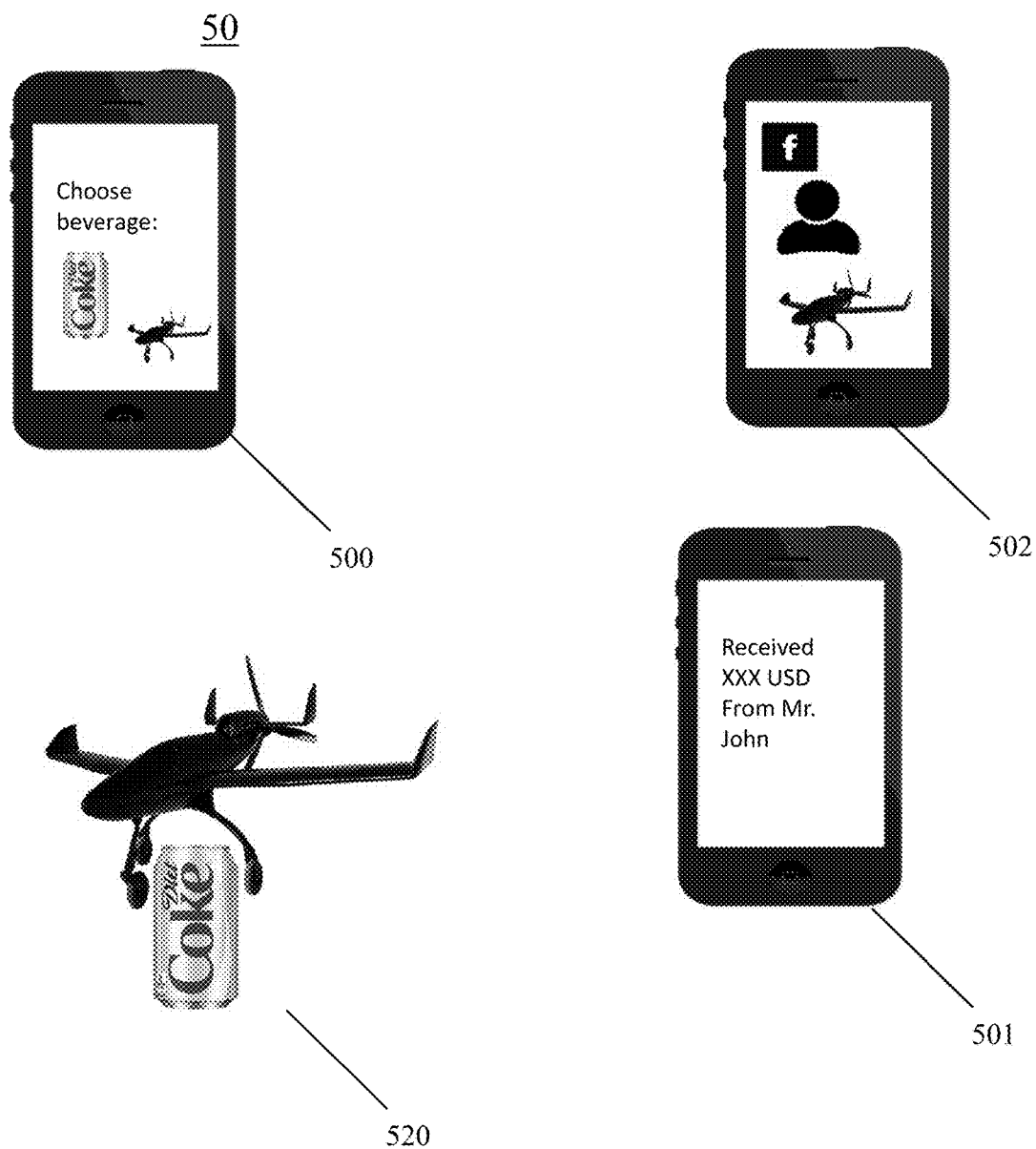
FIG. 5 demonstrates an embodiment 50 of a more elaborate software programme product in accordance with the invention as a screen shot diagram.

FIG. 5 demonstrates an embodiment 50 of a more elaborate use scenario in accordance with the invention as a screen shot diagram. The screenshots of embodiment 50 relate to an identical or similar system as described in FIG. 4, embodiment 40. In this embodiment the drone 120 is a waitressing drone that is configured to fly or drive to deliver food and beverage orders to customers. In this particular use case 500 the customer orders a Diet Coke, for example by clicking on the Diet Coke icon on the smartphone display. Preferably, a picture of the drone making the delivery is also shown on screen 500. For hot or cold drinks or food, the drone may be equipped with a heater and/or a cooler, and a cavity with thermal insulation. The drone may have solar cells on it to collect electricity from sunlight or other light. Preferably the solar cells are tandem solar cells, i.e. multi junction solar cells, so that they have higher efficiency per unit area. Multi junction solar cells are available for example from EMCORE.

The drone (520) is configured to display social network data (440), such as the user picture (440), to help identify which drone is servicing which user. The screen 502 shows the user entering his social network user profile credentials, Facebook credentials in this case, to the drone via the communication network of cloud server and/or social network as described earlier. In some embodiments the social network credentials, or all or some user data, and the delivery location can be sent directly to the drone via a radio or optical link, such as NFC, Bluetooth, Wi-Fi or the like, without the data entering the Internet or telephony network. The entry of the social network user profile credentials or user data in screen 502 can take place before, after or simultaneously to making the order in screen 500 in some embodiments.

In some cases, the drone 520 delivers the Diet Coke to the customer location, typically determined from the customer's smartphone location. The diet Coke is held by three grabbing levers underneath the drone 520, that can grab and release the Diet Coke based on user command or other external command coming from, for example, the operator of the restaurant. Other ways and devices for the drone to grab and/or carry the Diet Coke can, such as a beverage holding cavity within the drone, are also in accordance with the invention.

The drone (520) is configured to collect payment in some embodiments. The customers can put cash into the drone 520, in which case the drone carries the cash to the cashier register and returns change. Alternatively, the users could pay their purchases via the webpage of the restaurant with a credit card or PayPal for example. Alternatively, the users could make the payment to the social network account of the restaurant, for example with a credit card, or Face Pay, PayPal or the like.

In one alternative the drone collects the credit card credentials by the user or drone swiping the magnetic band of the card, or by the user or drone entering the microchip end of the credit card into a card reader included in the drone or carried by the drone, and the user entering a PIN number of the credit card, if requested. The drone 520 may also feature a touch pad and/or touch screen on which the user can provide a signature with a pen to authorise the credit card payment. Biometric identification such as fingerprint identification or retina scan can also be used to authorise a payment in accordance with the invention.

The payment can be made via the Internet or telecommunication network just by using the mobile subscriber terminal, for example from a credit card associated with an iCloud account, or alternatively the drone application installed in the mobile subscriber terminal has requested and stored the credit card details independently. In this embodiment the ID of the subscriber terminal that made the payment, and other relevant payment info such as the end total, is preferably immediately dispatched so that the drone system knows what orders have been paid.

It is also possible that the payment could be made with a social network payment, such as the ones described in my patent application U.S. patent application Ser. No. 15/060, 659, titled "Method and Means for Social Network Payments" in accordance with the invention. This document is cited here as reference.

When the payment has been made and received, in some embodiments this is communicated to the customer as shown in screen 501, e.g.: "Received XXX USD from Mr. John."

On a larger scale, the server computer 130, or a computer in the social network, is configured to receive said user orders and be in connection with a fleet of a plurality of drones, and is configured to select, optionally queue, and dispatch the orders to individual drones. Many optimisations/specialisations are possible in accordance with the invention, for example one drone can just deliver Diet Cokes or bottles of water, whereas one drone can just collect payments. The drones assigned to the different tasks can be different programmatically, electronically, mechanically, to suit the designed purpose.

Any features of embodiment 50 may be readily combined or permuted with any of the other embodiments 10, 20, 30, 40, 60, and/or 70 in accordance with the invention.

Figure 6:
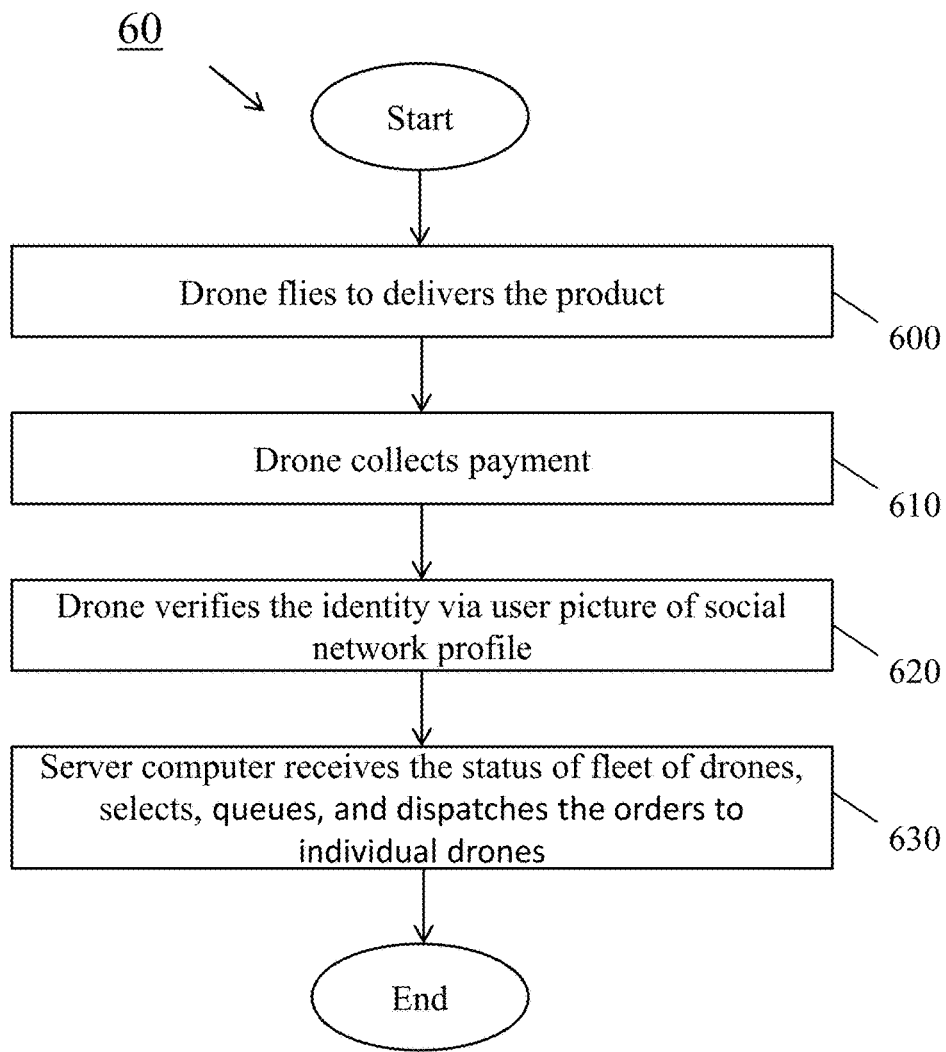
FIG. 6 demonstrates an embodiment 60 of a more elaborate method for delivering products in accordance with the invention as a flow diagram.

FIG. 6 demonstrates an embodiment 60 of a more elaborate drone delivery method in accordance with the invention as a flow diagram. Here the drone 120, 520 is a waitressing drone that flies or drives to deliver food and beverage orders to customers. The order has already been made with social network credentials or other credentials and the drone is delivering the ordered product in phase 600. Upon delivering the product, for example a Diet Coke or a bottle of water, the drone (120, 520) collects payment (410) in phase 610. Payment collection methods were already explained with embodiments (40, 50) and the same alternatives apply here. In some embodiments the drone (120, 520) releases the ordered product to the customer only after the payment has been made to said drone (120, 520) or the drone is updated by the computer systems of the restaurant or via social network 100 that the payment has been made.

In phase 620 the drone verifies or assists in verifying the identity of the customer. For example, the drone (120) may display social network data, such as the user picture (440), to help customers identify which drone is servicing which user or customer. In some embodiments the drone (120, 520) typically only brings the product to the location of the smartphone that made the relevant order, and as there can be more than one customer in proximity, it is useful to show details of the customer making the order, so that very similar or identical orders between customers can be easily distinguished by the at least one customer. This situation can also occur at another location that is designated by the user, and the user picture of the person who made the order, or the user picture to whom the order has been sent can be displayed by the drone, so that the correct order can be identified by the consumers. The said pictures may be obtained from the social network, or from the Internet, for example via search, or from the cloud network servers 130 that preferably store user pictures.

As old orders get processed and new orders come in, in phase 630 the server computer (130) receives said user orders and is connection with a fleet of a plurality of drones, and selects, queues, and dispatches the orders to individual drones. This way the method of embodiment 60 can be operated in a closed loop fashion on a large scale making the waitressing of at least very simple products very economically efficient and customer friendly.

Any features of embodiment 60 may be readily combined or permuted with any of the other embodiments 10, 20, 30, 40, 50, and/or 70 in accordance with the invention.

Figure 7:
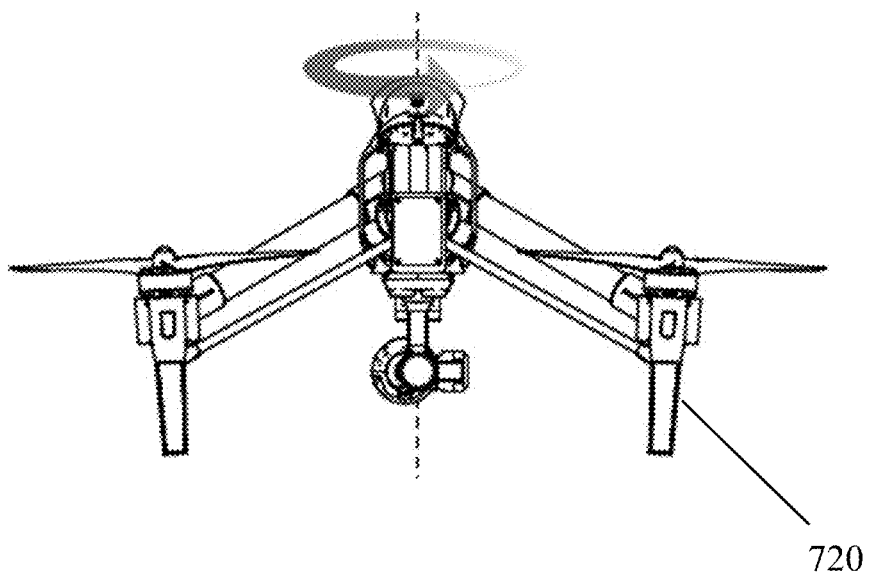
FIG. 7 demonstrates an embodiment 70 of the flying drone(s) in accordance with the invention as a diagram.

FIG. 7 demonstrates an embodiment 70 of a drone system in accordance with the invention as a block diagram. This is a drone 720 that is capable of flying with rotors, as the FIG. 7 shows. In this embodiment at least one drone (720) is configured to have a non-human social network profile. Said non-human social network profile is configured to interface and receive instructions from at least one human social network profile. For example, a human user could look up pictures or video that the drone has recorded or is currently taking with an on-board camera or other camera, for example via the non-human social network profile of the drone. In some embodiments these pictures show how well the drone has performed some tasks, by showing the work result, of e.g. lawn moving, cleaning or the like.

This drone 720 is operable in a computer system similar or identical to what has been described in FIGS. 1 and 4 earlier. The system may comprise at least one mobile subscriber terminal 140, at least one drone 720 and/or at least one server computer 130, and a communication network, which is typically the wireless Internet or the wireless cellular telephony network.

In some embodiments, the mobile subscriber terminal 110 is configured to have an application installed that allows the user 140 to select a product or service, for example by touching an icon illustrating the product on the screen of the mobile subscriber terminal.

The application is configured to receive the user choice and transmit the choice and/or social network profile or personal data of the user to the drone 720 and/or the server computer (130, 430).

In this embodiment at least one drone 720 is configured to receive said user choice and said user data via a non-human social network profile of said drone 720. The user choice and said user data can be inputted from a human social network profile via the social network, via a web interface, and/or by messaging using SMS-, email-, MMS-, or the like messaging channels to address the non-human social network profile in accordance with the invention. In some embodiments the user choice and user data can also be communicated to the drone 720 from a drone control application on the mobile subscriber terminal of the user via cloud server network 130, the Internet and/or the cellular telephony network. In some embodiments the user choice and user data can also be communicated to the drone 720 from a drone control application on the mobile subscriber terminal of the user via a short range radio connection, without using the Internet and/or the cellular telephony network. Ideally the system of the invention is configured to use any of the communication paths as appropriate.

The non-human social network profile typically lists capabilities and attributes that the drone has, which include payload, speed, response time, cost, cost per unit of time for use and the like. The human users may readily evaluate these attributes based on their needs when they are determining whether to engage the drone to do something, via their social network profile or via some other communication method. These attributes may also be displayed in the drone control app in accordance with the invention. In this embodiment the non-human social network profile could for example disclose that this drone is a flying drone with an operation range of 1 km, and a payload of 1 kg, and that it is 2 minutes in flight time away from you, and the location of the user and the drone could both be shown on the map, and that it is ready to deliver a Diet Coke to you in 3 minutes and that the cost of the Diet coke will be 1 euro and the cost of delivery will be 20 eurocents.

Further, the non-human social network profile could include reviews, references and recommendations from other users, who might have used, or considered using the services of this drone. The reviews could be of the kind: "This drone really delivers everything on time, and by the way, the temperature of the beverage is nicely cool too."

This feature is also especially useful for situations of a plurality of users, and/or partial ownership or sharing users situations, as the partial owners or sharing users of the drone 720 may observe the status of the drone 720 via the non-human social network profile. The partial owners or sharing users can also see the tasks from the other different partial owners, for example by using their human social network profiles. Drones that require a bigger capital investment, such as self driving cars or aeroplanes, benefit especially from sharing as this reduces the capital cost per user.

In one embodiment the sharing of the drone 720 takes place via an application installed on a mobile subscriber terminal. This application is typically an iOS, Android and/or Windows phone application, but may also be an application leveraging social network and search engine APIs (Application Programmer Interface), and being able to interact with a social network and/or a search engine. This interoperability is useful in many ways.

The interoperability with a social network is useful for example in an implementation scenario where the recipient of the product or service to whom the drone delivers the product or the service is identified by the social network profile of that user. Preferably, the drone will use all available data from the social network profile to tailor the product or solution to meet the preferences and/or best interest of the recipient and/or sending user. For example, if the social network profile reveals an age, and the product is a ticket, and a discounted ticket is available for the person of the age of the recipient, the drone will retrieve and deliver the ticket of discounted price to the recipient.

The interoperability with a search engine is useful in many implementation scenarios, for example in one where the drone delivery location/destination is identified by a name or address, in which case the name and/or address can be converted to a co-ordinate or a map location by using Google Maps or other location based applications with search capabilities.

The user typically opens the app and is presented with a user interface that displays the drone 720 that would be available for hire, and this can be displayed on a list, possibly with other drones, or on a map, possibly with other drones, for example. Typically, the user interface shows an image or a description of the drone 720, the type of service it provides, for example Diet Coke delivery, the price of the service per unit of time 3 euros/hour, and the time it takes for the drone to arrive, e.g. 2 minutes and/or begin the requested service at the requested location, which of course can be different than the location of the user in accordance with the invention, but in this exemplary case is not different because the drone is delivering the Diet Coke to the user.

However, in some embodiments the drone 720 could be sent directly to a different person with the Diet Coke by providing the phone number or email address or social network user ID or location of this user or desired Diet Coke recipient. This way the drones can be used to deliver gifts efficiently, and in this case the user could treat another person to a Diet Coke for example on the other side of a football stadium, provided he can somehow give the identity of the person to the drone 720, which can find out the location of the another person, i.e. the Diet Coke recipient. In some embodiments the drone is equipped with a camera and facial recognition software, so it may identify the desired recipient of the Diet Coke from the environment by comparing the camera image recording with the social network profile photo, or another photo, of the selected Diet Coke recipient. After a successful recognition the drone follows and approaches the identified recipient and may also send a message to the identified recipient via SMS, email or the social network in some embodiments. The message may say: "I am delivering a Diet Coke from "Sender of delivery"", for example.

The user typically selects the drone 720 and the service he/she purchases from the drone, i.e. Diet Coke delivery. The user also typically, but not necessarily, authorises the purchase by payment details from his/her credit card. The application typically stores the payment details of at least one credit card with which the payment of the purchase can be carried out. The purchase and the payment may contain only the price of the service of the drone i.e. the delivery of the Diet Coke, or the price of the purchase i.e. the price of the Diet Coke also. It is in accordance with the invention that the price of the service i.e. delivery and the product i.e. Diet Coke could be set to fluctuate to balance demand and supply. This could be achieved by charging more for delivery when the drone 720 is oversubscribed with delivery orders.

Also, different activities from the same drone can be priced differently, for example waiting in one place for the user or another person to pick up the Diet Coke could be charged at a lower rate than flying time as the wear-and-tear cost on the drone is higher when it is performing an active service, in contrast to just waiting.

Also the use of a non-human social network profile is beneficial from the perspective of legal responsibility. Clearly the drone cannot be prosecuted for compensation on accidents/crimes, and when a drone is carrying out activities accidents may occur that leave some party with the experience that they were a victim of an accident or crime where compensation would be due. The social network structure of the invention is excellent in resolving this problem, because the correspondence between the human social network profiles and the non-human social network profile reveal which human users are causally linked to the operation of the drone that caused the accident/crime. For example, a sharing user that has not used the drone at all, as evidenced by complete lack of instructions between the drone and user social network profiles, can most probably be deemed innocent to any accident that the drone has been in. However, a sharing user will be liable, if the drone has communicated: "Road closed, do you want me to continue?", and the user has replied "yes", and the drone drops of the cliff at the end of the road and falls on someone's house. The social network communication between the drone and the user will reveal that ultimately the cause of the accident was the command to use this unauthorised road, and that command was issued solely by one user. Similarly, the activities between the drone control app, cloud server network 130 and the drones can be recorded into the cloud network for later viewing and use.

Any features of embodiment 70 may be readily combined or permuted with any of the other embodiments 10, 20, 30, 40, 50, and/or 60 in accordance with the invention.

The invention has been explained in the aforementioned and sizable advantages have been demonstrated. The order input time is greatly reduced for the consumer, the consumer may move about while waiting for the order as the drone finds the consumer. Also a consumer can use multiple drones efficiently and flexibly with the invention while doing other things. Also importantly, the social nature of the drone allows for the sharing of drones among multiple human users. Further, the interfacing of the social human profile with non-human drone profiles allows for the continuous retraining and reprogramming of drones to meet more specific and individualistic user tasks, thereby liberating people from mundane manual labour.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

International Publication No. WO 2015/177760 A2, UNMANNED DRONE, ROBOT SYSTEM FOR DELIVERING MAIL, GOODS, HUMANOID SECURITY, CRISIS NEGOTIATION, MOBILE PAYMENTS, SMART HUMANOID MAILBOX AND WEARABLE PERSONAL EXOSKELETON HEAVY LOAD FLYING MACHINE, published on Nov. 26, 2015, Zhou et al.

Method and means for social network payments, U.S. Ser. No. 15/060,659, Mikko Väänänen, 2016.

The invention claimed is:

1. A computer system, comprising at least one mobile subscriber terminal, at least one drone and/or at least one server computer, and a communication network, characterised in that, the mobile subscriber terminal is configured to have an application installed that allows a user to select a product or service, the application is configured to receive the user selection and transmit the selection and social network profile or personal data of the user to the drone directly and/or via the cloud server computer with the location of the mobile subscriber that made the selection, at least one drone is configured to retrieve the product and/or prepare for delivery of service and/or product and approach the mobile subscriber location that is being sent multiple times to the drone until the product or service is delivered, wherein the drone is a waitressing drone that is configured to fly or drive to deliver food and beverage orders to customers, wherein the drone is configured to display social network data, including a user picture, to help identify which drone is servicing which user.

2. A system as claimed in claim 1, wherein the drone is configured to collect payment.

3. A system as claimed in claim 1, wherein the server computer is configured to receive said user orders and be in connection with a fleet of a plurality of drones, and is configured to select, optionally queue, and dispatch the orders to individual drones.

4. A computer software program product stored in a non-transitory memory medium, operable with at least one mobile subscriber terminal, at least one drone and/or at least one server computer, and a communication network, characterised in that, the mobile subscriber terminal is configured to have an application installed that allows a user to select a product or service, the application is configured to receive the user selection and transmit the selection and social network profile or personal data of the user to the drone directly and/or via the cloud server computer with the location of the mobile subscriber that made the selection, at least one drone is configured to retrieve the product and/or prepare for delivery of service and approach the mobile subscriber location that is being sent multiple times to the drone until the product or service is delivered, wherein the drone is a waitressing drone that is configured to fly or drive to deliver food and beverage orders to customers, wherein the drone is configured to display social network data, including a user picture, to help identify which drone is servicing which user.

5. A non-transitory memory medium storing a software program as claimed in claim 4, wherein the drone is configured to collect payment.

6. A non-transitory memory medium storing a software program as claimed in claim 4, wherein the server computer is configured to receive said user orders and be in connection with a fleet of a plurality of drones, and is configured to select, optionally queue, and dispatch the orders to individual drones.

7. A method for delivering products and/or services, comprising at least one mobile subscriber terminal, at least one drone and/or at least one server computer, and a communication network, characterised in that, the mobile subscriber terminal application allows a user to select a product or service, the application receives the user selection and transmits the selection and social network profile or personal data of the user to the drone directly and/or via the cloud server computer with the location of the mobile subscriber that made the selection at least one drone retrieves the product and/or prepares for delivery of service and approaches the mobile subscriber location that is being sent multiple times to the drone until the product or service is delivered, wherein the drone is a waitressing drone that flies or drives to deliver food and beverage orders to customers, wherein the drone displays social network data, including a user picture, to help identify which drone is servicing which user.

8. A method as claimed in claim 7, wherein the drone collects payment.

9. A method as claimed in claim 7, wherein the server computer receives said user orders and is in connection with a fleet of a plurality of drones, and selects, queues, and dispatches the orders to individual drones.

\* \* \* \* \*